US00RE43733E

(19) United States
(12) Reissued Patent
Higgins et al.

(10) Patent Number: US RE43,733 E
(45) Date of Reissued Patent: Oct. 16, 2012

(54) METHOD AND APPARATUS FOR IMPROVING BOILER COMBUSTION

(75) Inventors: Daniel R. Higgins, Tigard, OR (US); Eugene Sullivan, Mobile, AL (US)

(73) Assignee: Clyde Bergemann, Inc.

(21) Appl. No.: 12/398,075

(22) Filed: Mar. 4, 2009

Related U.S. Patent Documents

Reissue of:
(64) Patent No.: 7,185,594
Issued: Mar. 6, 2007
Appl. No.: 10/884,000
Filed: Jul. 2, 2004

(51) Int. Cl.
*F23G 7/04* (2006.01)
(52) U.S. Cl. ..... 110/238; 110/348; 110/297
(58) Field of Classification Search ..... 110/204, 110/238, 348; 162/31
See application file for complete search history.

(56) References Cited

U.S. PATENT DOCUMENTS 4,304,196 A 12/1981 Chadshay et al.
5,001,992 A 3/1991 Higgins et al.
5,044,327 A 9/1991 Hunt
5,121,700 A 6/1992 Blackwell et al.
5,139,412 A 8/1992 Kychakoff et al.
5,205,227 A * 4/1993 Khinkis et al. ..... 110/345
5,305,698 A 4/1994 Blackwell et al.
5,307,745 A 5/1994 Higgins et al.
5,724,895 A * 3/1998 Uppstu ..... 110/238
5,809,910 A * 9/1998 Svendssen ..... 110/235
6,230,664 B1 * 5/2001 Janka et al. ..... 122/4 D
6,302,039 B1 10/2001 MacCallum et al.
6,497,230 B1 12/2002 Higgins et al.
6,742,463 B2 * 6/2004 Saviharju et al. ..... 110/238
* cited by examiner

*Primary Examiner* — Kenneth Rinehart
*Assistant Examiner* — David J Laux
(74) *Attorney, Agent, or Firm* — Michael J. Mehrman; Mehrman Law Office, P.C.

(57) ABSTRACT

A combustion air system for a recovery boiler is described in which multiple levels of secondary and tertiary combustion air ports each have an even number of ports, with the ports on opposing walls interlaced. The air system lends itself equally well to front/rear wall or sidewall applications and is especially beneficial for rectangular boilers. The air system features large and small-scale horizontal circulation zones superimposed on each other and the ability to adjust the angle of the air jets. Additional features include port dampers for the starting burners and system control based on kinetic energy.

25 Claims, 7 Drawing Sheets

TOP VIEW

FRONT VIEW

TOP VIEW

TOP VIEW

TOP VIEW

TOP VIEW

TOP VIEW

SIDE VIEW

TOP VIEW

SIDE VIEW

METHOD AND APPARATUS FOR IMPROVING BOILER COMBUSTION

Matter enclosed in heavy brackets [ ] appears in the original patent but forms no part of this reissue specification; matter printed in italics indicates the additions made by reissue.

BACKGROUND OF THE INVENTION

Recovery boilers are well known in the pulp and paper industry as a means to recover spent cooking chemicals and the associated heating value to produce steam for process use or power generation. The spent cooking chemicals are recycled after being used to dissolve wood chips to liberate fibers for papermaking. The fibers are separated from the chemical bath, which contains a high concentration of organic material that can be burned in the recovery boiler. The "spent" cooking chemicals are recovered from the chemical bath through the combustion process. In order to recover the spent chemicals and burn the organic matter, much of the water is evaporated from the chemical stream, with the resultant forming concentrated "black liquor" with upwards of 75% solids content (organic and inorganic materials). This black liquor is sprayed into the boiler in an atomizing fashion forming droplets that dry and go through several processes, and expel flammable gasses and char material. To activate some of the cooking chemicals, they are chemically reduced, which requires high heat. Since the total cooking chemicals are inorganic, almost all fall to the floor of the boiler in the form of molten smelt that flows out of the bottom of the recovery boiler to be dissolved, processed and reused. The finer points of recovery boiler design and operation are described in detail in many patents, several of which are cited below. The black liquor is sprayed into the furnace by one or more injection nozzles at an elevation of from 4 to 10 meters or more. Combustion air enters the boiler at several levels via port openings arranged around the perimeter of the boiler, some levels above and some below the liquor spray. The interaction of the combustion air and flammable materials inside the boiler is crucial for the boiler to perform well. In particular, improving the mixing of the air and fuel improves the combustion and many dependent process variables. Being of finite size and heavily loaded, many recovery boilers are at the limit of their ability to process black liquor while using outdated combustion air systems. The combustion air system consists of all of the design parameters and components required to introduce combustion air into the boiler. This includes fans, air heaters, ducting, dampers, port cleaners, instrumentation, controls, actuators, and the size and arrangement of the port openings themselves. The port openings are the openings in the walls of the furnace through which the combustion air enters. The present invention is focused on an improved arrangement of combustion air ports for a recovery boiler.

Typical recovery boilers consist of a floor and walls constructed from heavy steel tubing, welded together forming walls with the tubes running vertically. The walls and floor form a large box that contains the combustion. The tubes are filled with water that circulates through the floor and walls and absorbs heat from the combustion in the boiler. The water eventually flows upward to the convective heat transfer sections located at the top of the boiler. These include the screen tubes, superheater and generating bank. Combustion air is typically injected into the furnace at a variety of levels, with the primary and secondary levels located below the liquor spray, and the tertiary and higher levels located above the liquor spray. Some boilers have combustion air introduced at or very close to the liquor spray level. There may be from one to over ten different levels of combustion air. Many arrangements of combustion air systems are described in the literature and patents, some of the more pertinent examples being U.S. Pat. No. 5,121,700 (Blackwell et al.), U.S. Pat. No. 5,305,698 (Blackwell, et al.), U.S. Pat. No. 5,724,895 (Uppstu), and U.S. Pat. No. 6,302,039 (McCallum et al.). Many of these concepts have been tried on operating boilers and have yielded varying degrees of success. Until recently it has not been possible to test a combustion air system concept thoroughly. Prior to the advent of advanced computational fluid dynamic (CFD) modeling, engineers had to rely on experience, similitude, and mathematical models to predict the performance of a combustion air system design. CFD modeling techniques and software, combined with high performance computers, now permits the accurate, comprehensive, and economical testing of combustion air systems, and the comparison of many different designs. While some CFD modeling may have been used in the development of the above patents, it was not of the sophistication that is currently available. Extensive "estate of the art" CFD modeling was used to develop the present invention and to test various combustion air systems including many of those cited in the above references. The Combustion air system described in this application has been shown to outperform the older combustion air system designs in a variety of ways.

The invention described here is mainly concerned with the arrangement of the combustion air port openings through the boiler walls. The arrangements of the fans, heaters, ducting, etc., are typically employed according to common engineering practice, with the exceptions detailed below. It has been revealed by experience and CFD modeling that the air jets emitted from the combustion air ports must be at least partially interlaced in order to be effective at mixing the fuel and air while limiting the carryover associated with high vertical gas velocities in the boiler. Carryover is the particulate matter that is a by-product (or portion of) the black liquor sprayed into the boiler that is entrained in the vertical gas flow. The combustion air mainly flows upward in the boiler carrying particles to the convective heat transfer surfaces where it can eventually plug the entire boiler. High vertical velocities and poor mixing also carry high temperatures into the upper boiler because combustion is delayed, and transport times are faster. The combination of high carryover and high temperatures causes rapid fouling in the upper furnace.

Many older combustion air systems employ air ports arranged in several levels. A "level" consists of all those combustion air ports arranged at about the same elevation on the boiler and excludes burner ports, camera ports, and etc. The primary level typically consists of one or two horizontal rows of air ports on all four sides of the boiler. The primary level is the lowest level in the boiler and may supply up to 50% or more of the total required combustion air. Above the primary level but below the liquor spray is the secondary level or levels. Common practice is to have a single secondary level but zero to four or more levels have been tried. The secondary level may supply up to 50% of the total combustion air. Above the liquor spray is the tertiary level. The tertiary most typically consists of a single level but may have 6 or more levels. The tertiary may supply up to 50% of the total combustion air, but 20% is more typical. Some boilers are fitted with a quaternary level above the tertiary, but the delineation is often merely semantics. For the sake of this discussion, all levels above the liquor spray will be referred to as tertiary air, unless that level is fed with something other than combustion air (e.g. re-circulated flue gas or dilute non-condensable gasses).

An interesting development in recovery boiler air systems is described in the Uppstu patent, U.S. Pat. No. 5,724,895. This patent details a "vertical" air system with many secondary and tertiary levels. This "vertical" system has many air levels, but practice has shown that it is virtually impossible to use all these levels and openings because, to do such would mean that the airflow mass at each opening would be too little to have any influence on the mixing of air and fuel. The energy supplied with the combustion air system supplies the mixing energy for combustion, and if the airflow from an air jet is too weak, then the mixing is subsequently weak. This air system was designed to limit NOx emissions in Scandinavia and is successful but limited in other ways and expensive to retrofit. For example, the production of NOx in a recovery boiler is a function of the combustion temperature. Higher temperatures form more oxides of Nitrogen than cooler combustion temperatures. Therefore the vertical air system is designed to "stage" the combustion to keep the peak flame temperatures down. While this helps to control NOx formation it may not reduce total reduced sulfur (TRS), and may not improve reduction efficiency, heat transfer, or char bed control, and may delay final combustion until high in the boiler where higher gas temperatures can be a problem as described earlier. The vertical air system is expensive to retrofit because more than seven levels of port openings and ducting must be installed. Where the vertical air system is successful is in creating vertical mixing zones in the furnace that improve the mixing and combustion to the extent that combustion air is limited (i.e. staged), but not all openings nor levels are simultaneously in use. While reducing NOx emissions is valuable, the overall benefit of the vertical air system is limited and the implementation is expensive. The invention described herein is an improved combustion air system that controls NOx emissions while also improving reduction efficiency, improving heat transfer to the boiler walls, improving boiler water circulation, improving char bed control, reducing carryover, reducing gas temperatures in the upper furnace, and reducing TRS and CO emissions, and is economical to implement.

SUMMARY OF THE INVENTION

In accordance with the invention, an improved combustion air system is provided for a [recovery] boiler*, such as a recovery boiler,* in which multiple levels of secondary and tertiary combustion air ports each have an even number of ports, with the ports on opposing walls interlaced. The air system is adapted for front/rear wall or sidewall applications. The system features large and small-scale horizontal circulation zones superimposed on each other and the angle of the air jets is adjustable. Interlaced or inboard/outboard spacing may be employed. Port sizes can be adjustable to modify air flow from a selected port. The air flow of ports can be the same as others, or may be different.

Accordingly, it is an object of the present invention to provide an improved combustion air system for a [recovery] boiler*, such as a recovery boiler*.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a view of a front wall of a furnace, while

DETAILED DESCRIPTION

Figure 1:
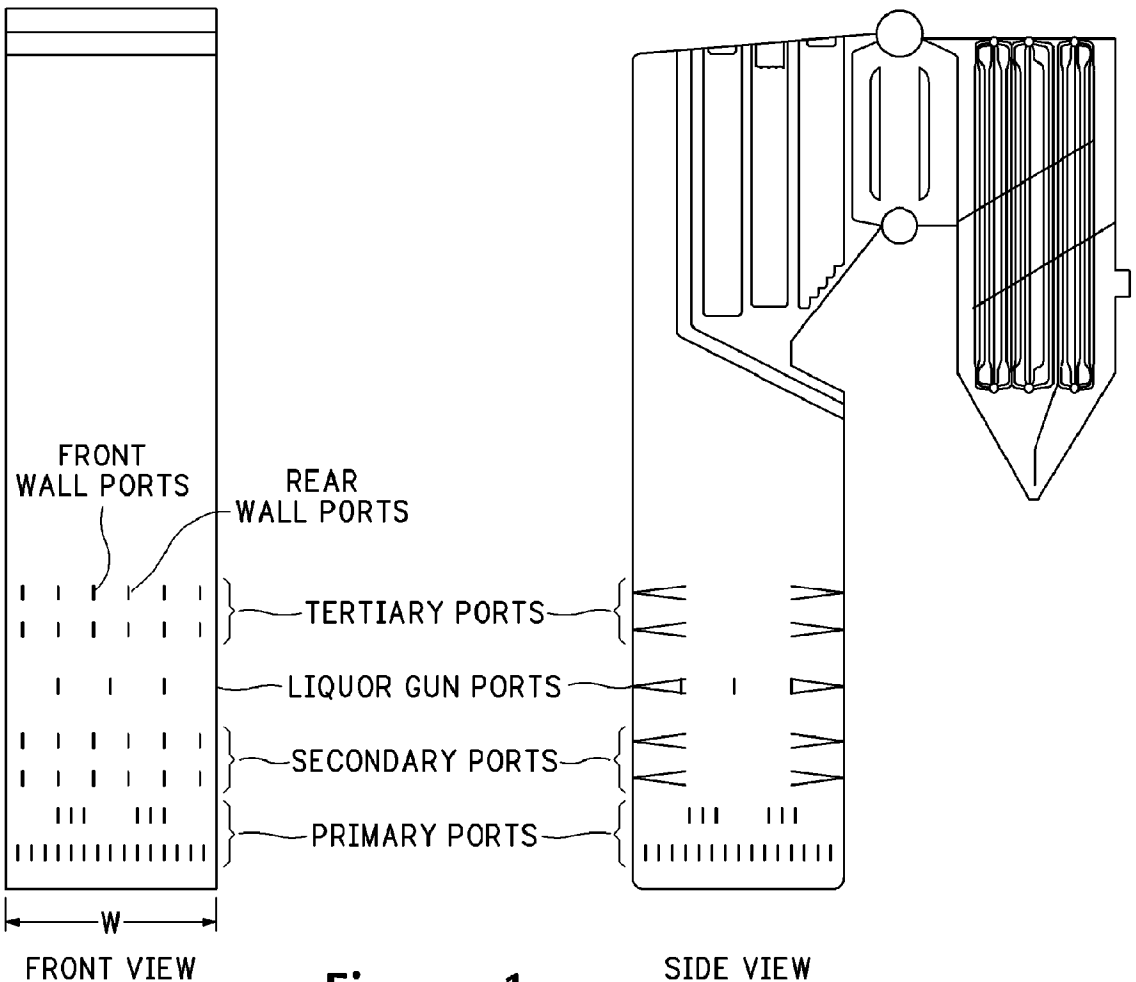
FIG. 1 is a front and side view diagram of a recover boiler air system.
Figure 2A:
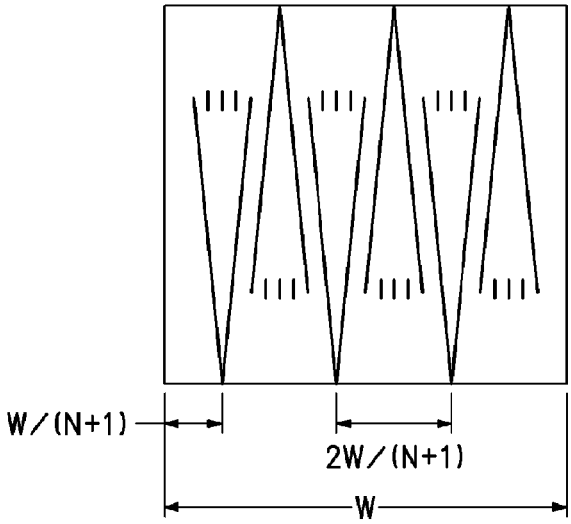
FIG. 2A is a top view of an interlaced configuration

The invention consists of an air system with one or two primary level, typically two secondary levels, and typically two tertiary levels. FIG. 1. Each of the secondary and tertiary levels has an even number of ports, for example, three ports on the front wall and three ports on the rear wall. FIG. 2A. The ports on the opposing walls are arranged in an interlaced fashion such that (for example) the front wall ports blow in between the rear wall ports and vice versa. This arrangement requires that the ports on one wall be offset from the ports on the opposite wall. For example the front wall ports may be pushed toward the left sidewall and the rear wall ports may be pushed toward the right side wall. Port spacing may be arranged as follows (assuming ports are on front and rear walls): If the width of the boiler is W, and there are N number of ports at a given level (for example three front+three rear=6 total), then the spacing from the sidewall to the first port is W/(N+1), and the spacing between ports is 2W/(N+1). These are example spacings, not requirements, and other spacings may be desirably employed.

Figure 2B:
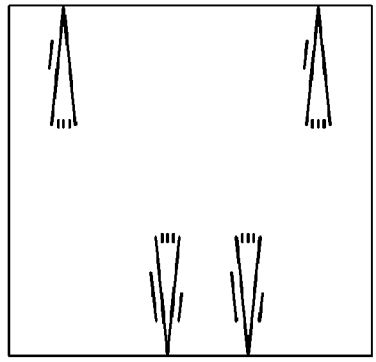
FIG. 2B is a top view of an inboard/outboard configuration.
Figure 2C:
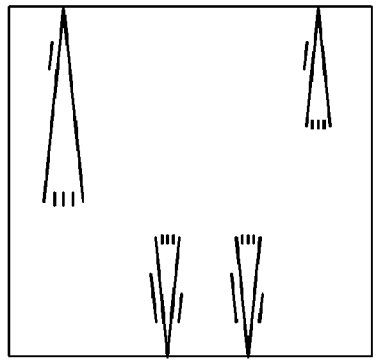
FIG. 2C illustrates a top view of an inboard/outboard configuration with different flow.

FIG. 2B illustrates an alternative configuration, called inboard/outboard, wherein on one sidewall there are two (in the illustrated example) ports spaced laterally farther apart, whereas on the opposing wall, there are two ports which are spaced relatively near, wherein the two near ports are positioned within the interior boundary defined by the distance between the two far apart ports of the opposite wall.

Figure 3:
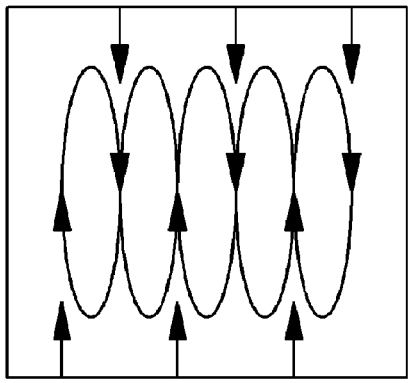
FIG. 3 is a diagram illustrating small cyclones of air jets.
Figure 4:
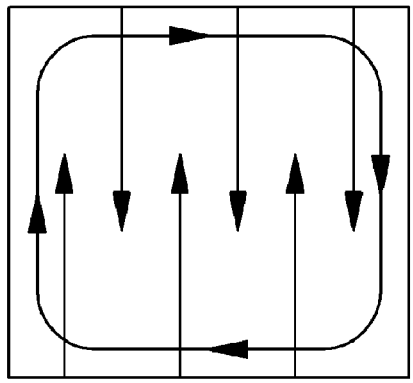
FIG. 4 is a circulation flow diagram of a larger circulation around the recovery boiler.
Figure 5B:
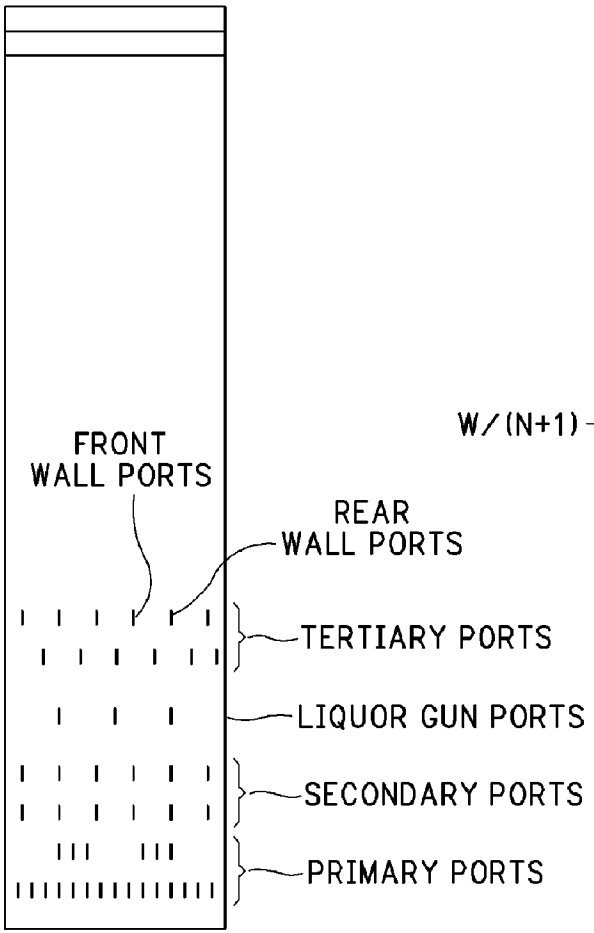
FIG. 5B is a view of a front wall of a furnace showing offsett of tertiary ports.
Figure 5:
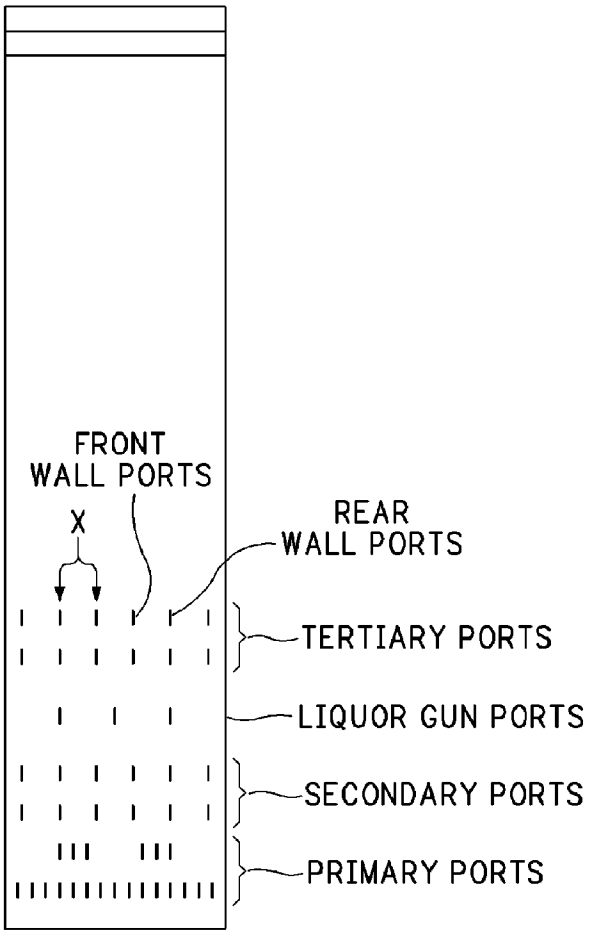

The centerline of the lowest secondary level is located about 1 meter above the centerline of the lowest primary port level. If the floor of the boiler is sloped, and the primary port elevations follow the slope of the floor, the lowest secondary level is about 1 meter above the lowest primary ports at the high end of the floor. The upper secondary level is located about 1 meter above the lower secondary level. The lower tertiary level is located from two to four meters above the liquor spray and the upper tertiary located from one to three meters above the lower tertiary level. These dimensions are referenced to the port centerlines. At the secondary level, the ports are arranged substantially directly above each other. At the tertiary level the ports are also arranged substantially directly above each other and directly above the secondary. This arrangement creates reinforced mixing zones as the fuel is burned and the gasses are rising from the secondary to the tertiary level. For example a small cyclone of gasses is created between each pair of interlaced air jets and this pattern is reinforced as long as the ports are directly above each other. FIG. 3. Because the ports are offset with one wall to one side and the opposite wall to the other side, a larger circulation is created that flows slowly around the perimeter of the boiler. FIG. 4. With the tertiary ports above the secondary ports the small cyclones and the larger rotation are reinforced. The smaller and larger rotational patterns have the effect of increasing the flow path and residence time of the combustible gasses giving them more time to burn out before they must exit the furnace. The preferred embodiment is to have the tertiary ports arranged substantially directly above the secondary ports to maintain the small and large rotations. In some cases it may be preferred to reverse the bias direction between the secondary and tertiary levels, which would tend to reverse the small rotations and cancel out the large rotations. For example, looking at the front wall of the furnace, if the left hand secondary ports are W/(N+1) from the left wall, the right hand tertiary ports may be W/(N+1) from the right wall. FIG. 5.

The alignment of the tertiary ports is such that they are substantially directly above the secondary ports, +/−2 tube spacings. In FIG. 5, the tertiary ports are directly above the corresponding secondary ports on a selected wall within distance X, which is +/−2 tube spacings. Also, the upper secondary ports are located directly above the lower secondary ports, and may be within +/−2 tube spacings. Still further, the upper tertiary ports are located directly above the lower secondary ports, and may be within +/−2 tube spacings relative in alignment.

Figure 6:
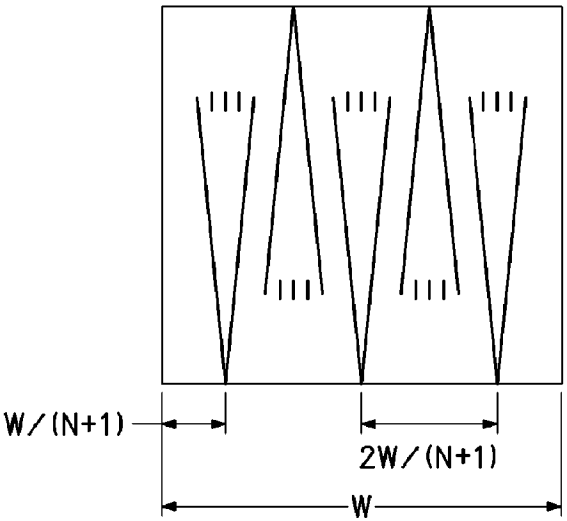
FIG. 6 is a top view illustrating air flow from ports.
Figure 7:
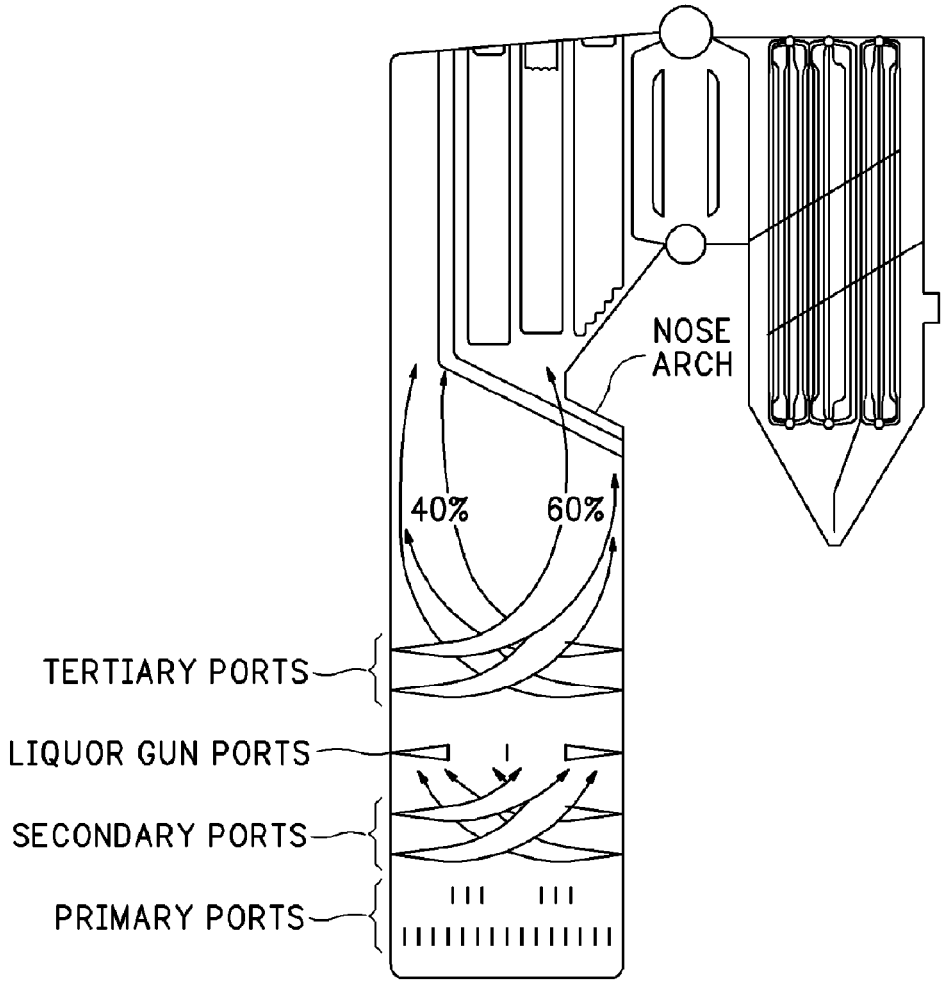
FIG. 7 is a side view of a recovery boiler illustrating air flow.
Figure 8:
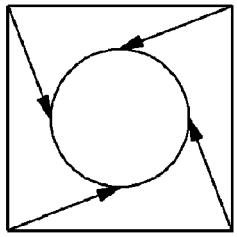
FIG. 8 is a top view illustrating large-scale rotations of the flue gas.
Figure 9A:
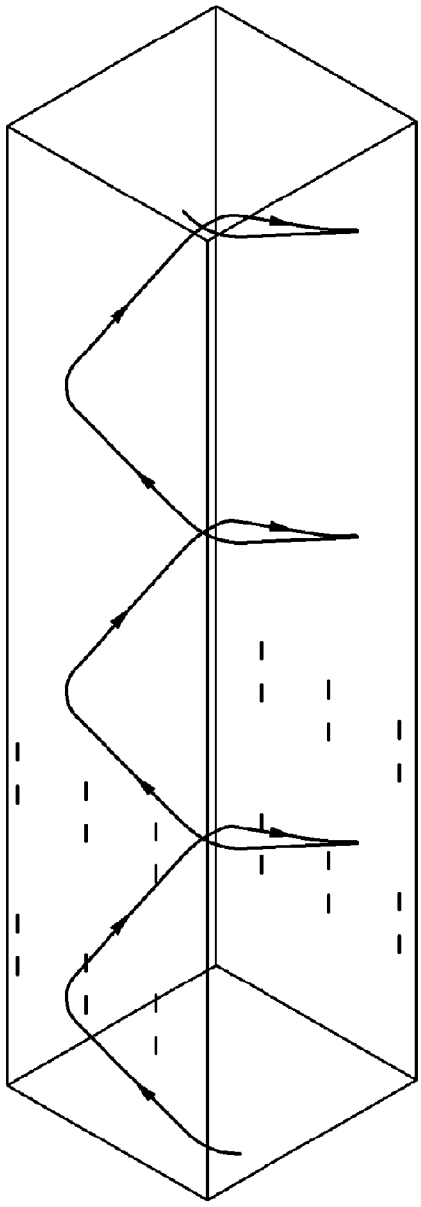
FIGS. 9A and 9B illustrate large-scale rotation superimposed on several small-scale rotations, viewed separately.
Figure 9B:
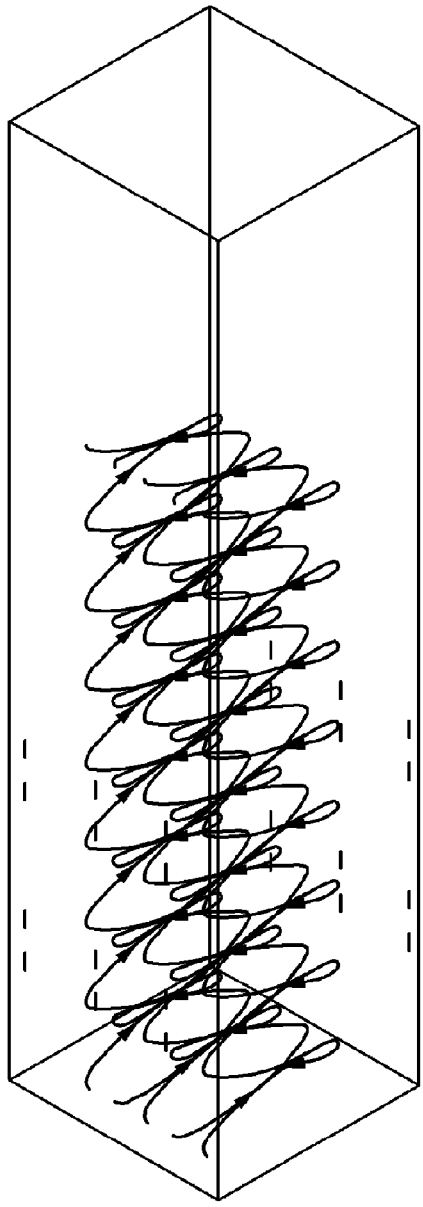
Figure 9C:
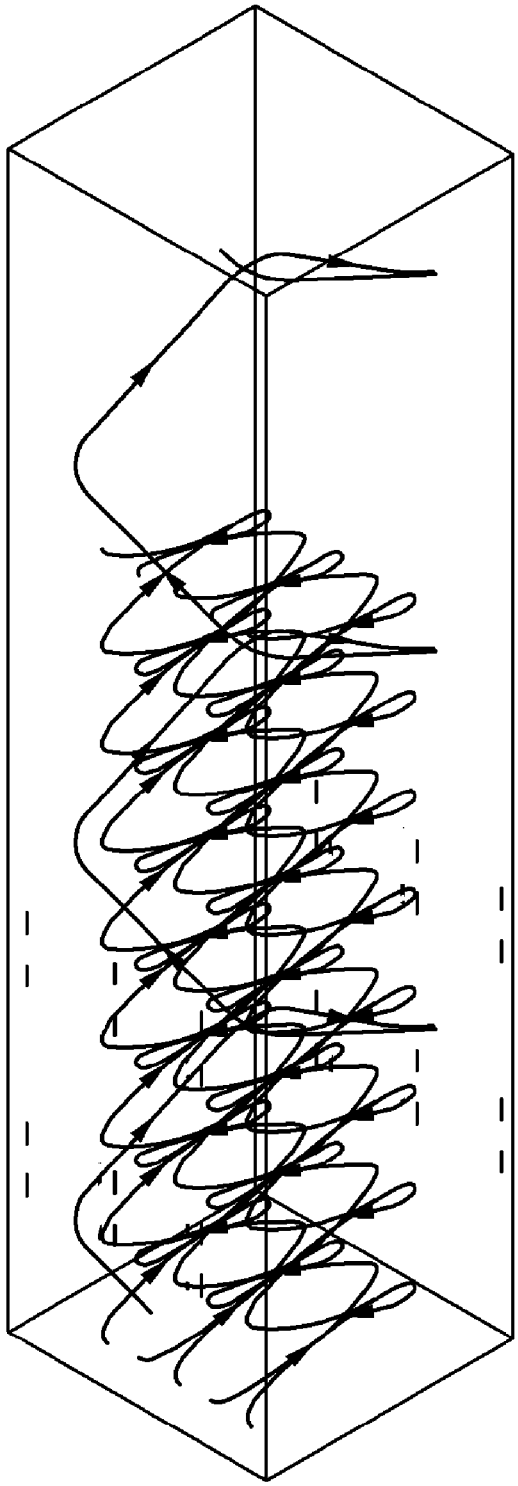
FIG. 9C illustrates the combined view thereof.

Most modern secondary and tertiary air systems utilize an odd number of ports (total per level) interlaced on the front and rear walls. FIG. 6. This arrangement balances the gas flows side to side across the width of the boiler to encourage even flows into the upper furnace. The imbalance front to back is mitigated by the influence of the nose arch in the rear wall of the boiler. The nose arch is a portion of the rear wall that bends out into the furnace cavity and directs the gas flow away from the rear wall and channels it across the superheater. FIG. 7. The nose arch also shields the convection surfaces from radiant heat from the fireball. If there are three ports at each level on the front wall and two on the rear wall, typically 60% of the secondary and tertiary air comes from the front wall, crosses the boiler and rises toward the rear of the furnace where it is intercepted by the nose arch. A secondary/tertiary air system with an even number of ports at each level (e.g. three interlaced with three) has inherently balanced flows front to back and side to side with the further advantage of creating a slow macro rotation due to the offset. In the past, large-scale rotations of the flue gas (typically from tangential firing, FIG. 8.) have been considered detrimental because of the tendency to form high-speed vertical cores that exacerbate the carryover and boiler plugging. The present embodiment, however, can be adjusted to, if desired, utilize a large-scale rotation superimposed on several small-scale rotations such that the overall flow path and residence time of the gasses is increased while maintaining low vertical velocities. FIG. 9. The result is that more of the furnace volume is used for combustion and heat transfer and for transporting the gasses upward. This reduces the average vertical gas velocity reducing carryover, upper furnace temperatures, and plugging, and improves heat transfer to the boiler walls.

The previously mentioned tangential firing systems have the additional inherent disadvantage of the rising gasses skewing off to one side of the boiler. Therefore the high-speed column of gasses becomes concentrated to one side which imbalances the boiler loading and preferentially plugs one side of the furnace and under utilizes the superheater. Many conventional air systems with opposed secondary and tertiary ports (non-interlaced) have the same problem. This illustrates the disadvantage of side-to-side imbalance. Air systems with an odd number of ports at the secondary and tertiary levels do not lend themselves to sidewall applications because they will create an imbalance in the gas flows side-to-side. For example, if three ports on the right sidewall are interlaced with two ports on the left sidewall, 60% of the gasses will rise on the left side of the boiler causing an imbalance. By contrast, the present invention has an even number of ports at each level therefore it can be applied as functionally to the sidewalls as to the front and rear walls. The ability to implement sidewall secondary and tertiary air systems can become important for rectangular boilers that are deeper than they are wide. Also, it is likely more important when the smelt spouts are located on the side walls. In these cases a sidewall air system better utilizes the plan area and volume of the furnace because the combustion air ports can be spaced further apart and do not have to carry as far across the boiler. It is also beneficial when implementing a front wall/rear wall system is prohibitively expensive due to physical constraints around the boiler. Also, it may be desired in some cases to locate the ports on the same walls as the spouts.

Figure 10:
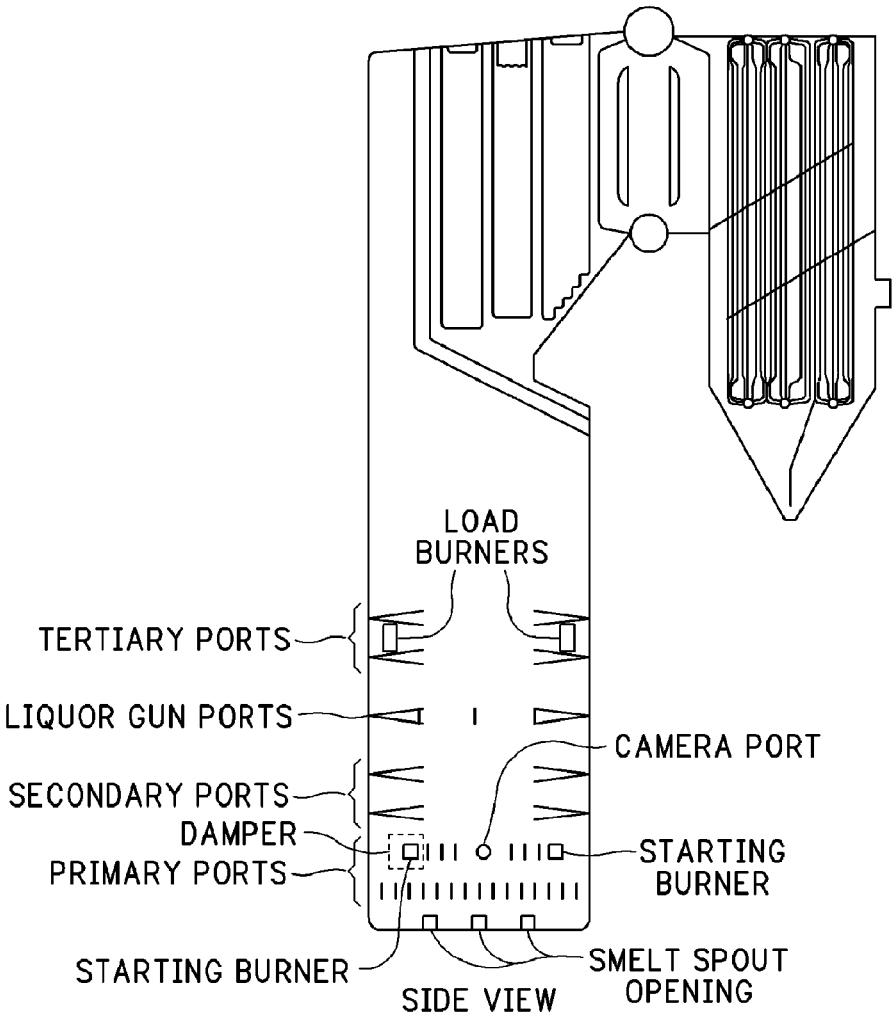
FIG. 10 is another recovery boiler side view.
Figure 10A:
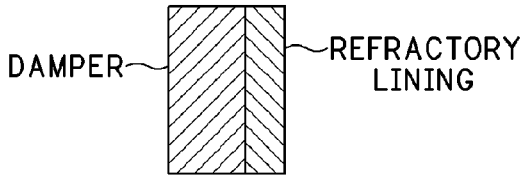
FIG. 10A is a side sectional view of a suitable damper installable over a starting burner port.

In addition to the combustion air ports there are several other openings in the boiler walls including smelt spout openings, camera openings, starting burners, liquor gun openings, load burners, particulators, etc. FIG. 10. All of these are sources of additional air entering the boiler. The smelt spout openings and liquor gun openings are typically open to the atmosphere therefore the amount of air that enters is minimal. The burner openings by contrast are typically large with four to six or more staring burners and zero to five or more load burners. The starting burners are often a large source of air entering the boiler because the combustion is intense at this level and it is necessary to cool the burners when not in use. This cooling air may account for 15% or more of the total combustion air. In typical combustion air systems, this air is at low velocity and not directed in a manner that improves the combustion in the furnace. On many boilers, the air entering through the starting burners is detrimental because it impedes the performance of the secondary air system and adds to the upward gas velocity without contributing to mixing the fuel and air. The present invention includes a means to reduce or eliminate burner-cooling air by closing the starting burner ports with a refractory lined damper, the refractory being necessary to protect the damper from the intense heat of combustion. A suitable damper is shown in phantom over one starting burner port in FIG. 10. FIG. 10A illustrates a sectional view of a damper with refractory lining. Most recovery boilers have the starting burners located on the sidewalls (although it is not required that they be on the sidewalls). As an alternative to the damper system, if the combustion air ports are located on the sidewalls, they can be combined with the burner ports so that the combustion air also cools the burners. Sidewall secondary systems are common place, some combined with the burner ports, however they all suffer from either too many ports, improper arrangement or ports that are too small. The present invention facilitates sidewall secondary and tertiary combustion air systems thereby solving these problems.

Burner ports tend to be bigger than air ports, so in the case of using the burner ports as airports also, in accordance with the present invention, dampers are employable to adjust the air flow from a modified burner port to be equivalent of a typical air port. The damper adjusts the size of the burner port to allow control and adjustment of the air flow.

Figure 11:
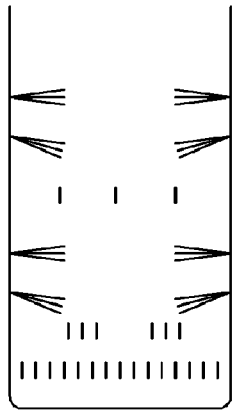
FIG. 11 illustrates angling the secondary and/or tertiary air jets downward.

Another embodiment of the present invention includes angling the secondary and/or tertiary air jets downward. FIG. 11. At the secondary level this directs the lower air jets downward to the char bed to improve char bed control. At the tertiary level, the lower tertiary ports are frequently placed higher than desirable due to constraints around the boiler (e.g. the tertiary operating floor). In these cases there is a volume of space above the liquor spray but below the tertiary level that is underutilized. By angling the tertiary jets downward this space can be better used for combustion. Also, the upward pressure of the rising gasses on the tertiary air jets tends to bend the air jets upward. This increases the vertical velocity component of the air jets. Angling the air jets downward tends to overcome this upward pressure. Angling the combustion air jets downward has been common practice at the primary level and in the past at the tertiary. The present invention however, includes the refinement of the system whereby the lower of the secondary or tertiary jets is angled downward while the upper-level is kept horizontal. This arrangement utilizes more of the lower furnace volume for combustion. Also, the lower jet protects the upper jet from being deflected upward more than necessary.

It may be desirable to change the angle of the air jets depending on load rate, char bed conditions, black liquor changes, etc. The present invention includes the ability to adjust the air jet angle in the vertical direction using a device similar to the Directional Autoport System described in U.S. Pat. No. 6,497,230 (Higgins et al.), copy enclosed. In this manner the invention departs from common engineering practice.

It is also desirable to balance the airflows from the secondary and tertiary levels such that they contribute equally to the mixing and combustion, and so that the rotational patterns are controlled throughout the furnace. Because the different levels may operate at different mass flows, temperatures, and velocities, it is not adequate to balance the system based directly on these parameters. Rather the system is balanced based on the kinetic energy of the air jets. Kinetic energy is defined as the mass flow times the velocity squared. ($E_k=mv^2$). In this manner, regardless of the differing mass flows and temperatures, each air jet can be adjusted to contribute equally to the combustion air system. This is important to maintain desired rotational patterns in the furnace and achieve the results predicted by the CFD models. The mass flow and velocity are typically controlled by adjusting the port opening using devices similar to U.S. Pat. Nos. 5,001,992 and 5,307,745 (Higgins et al), copies enclosed, and by adjusting the static air pressure. For example, which high mass flow and low velocity is present, the balance is made based on momentum, but if low mass and high velocity, then balancing is done based on kinetic energy.

In the system described, the amount of flow from the ports does not need to be the same. The flow can be adjusted on individual ports to achieve desirable results. For example, by reducing the outermost air flow, the use of more of the volume of the boiler is accomplished, with reduction or elimination of the large macro flow, while maintaining the small scale flows.

The system can employ interlaced or inboard/outboard port spacing. The port sizes can be adjustable. The port sizes do not need to be uniform, although they can be. The systems can inject non-compressible gases at the secondary or tertiary levels. The majority of the examples herein illustrate 3 b 3 interlaced systems (FIG. 2A, for example), but other numbers, such as 2 by 2 interlaced systems, are employable. Systems with side to side symmetry but not front to rear symmetry (e.g. 3 evenly space ports on one wall and 2 spaced ports on another wall) can be employed. Systems with front to rear symmetry but not side to side symmetry are also usable, for example, where there are 3 ports on the front and rear walls, but the spacing between ports on one or both walls are not uniform. Systems employing the above noted concepts can run at lower combustion air temperatures, which can be desirable.

While plural embodiment of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A combustion air system for a recovery boiler comprising [a large] *first and second opposing walls and a plurality of combustion air ports disposed on each opposing wall in an inboard/outboard configuration with at least two inboard ports spaced laterally apart on the first wall and at least two outboard ports spaced laterally apart on the second wall with the inboard ports laterally within an interior boundary defined by the outboard ports imparting multiple* upwardly spiral circulation [pattern] *patterns* of gasses [around the] inside [perimeter of] the boiler [defined about a substantially vertical axis of the boiler superimposed on a series of plural smaller upwardly spiral gas circulation patterns defined about plural substantially vertical axes of the boiler contained inside the large pattern].

2. A combustion air system for a recovery boiler consisting of one or more primary air levels, two or more secondary air levels, and two or more tertiary air levels incorporating an two or more number of combustion air ports at each of the secondary and tertiary air levels with half of the ports at each level on a first wall of the boiler, and half on the opposing wall, with all of the ports on the first wall either interlaced or in an inboard/outboard configuration with the ports on the opposing wall, in which the upper secondary ports are located directly above the lower secondary ports +/−2 tube spaces, and the upper tertiary ports are located directly above the lower tertiary ports +/−2 tube spaces, in which all of the tertiary ports on a first wall are located directly above the secondary ports on said first wall +/−2 tube spaces, and all of the ports on said first wall are inboard/outboard with secondary and tertiary ports similarly located on the opposing wall.

3. A combustion air system for a recovery boiler consisting of one or more primary air levels, two or more secondary air levels, and two or more tertiary air levels incorporating an two or more number of combustion air ports at each of the secondary and tertiary air levels with half of the ports at each level on a first wall of the boiler, and half on the opposing wall, with all of the ports on the first wall either interlaced or in an inboard/outboard configuration with the ports on the opposing wall, wherein the configuration is inboard/outboard, and the flow for at least one outboard port is different than flow for an inboard port.

4. A combustion air system for a recovery boiler consisting of one or more primary air levels, two or more secondary air levels, and two or more tertiary air levels incorporating an two or more number of combustion air ports at each of the secondary and tertiary air levels with half of the ports at each level on a first wall of the boiler, and half on the opposing wall, with all of the ports on the first wall either interlaced or in an inboard/outboard configuration with the ports on the opposing wall, in which the lower boiler is rectangular in plan form with the front and rear walls longer than the sidewalls and the secondary and tertiary ports located on the front and rear walls.

5. A combustion air system for a recovery boiler consisting of one or more primary air levels, two or more secondary air levels, and two or more tertiary air levels incorporating an two or more number of combustion air ports at each of the secondary and tertiary air levels with half of the ports at each level on a first wall of the boiler, and half on the opposing wall, with all of the ports on the first wall in an inboard/outboard configuration with the ports on the opposing wall, in which the lower boiler is rectangular in plan form with the sidewalls walls longer than the front and rear walls and the secondary and tertiary ports located on the sidewalls.

6. A combustion air system for a recovery boiler consisting of one or more primary air levels, two or more secondary air levels, and two or more tertiary air levels incorporating an two or more number of combustion air ports at each of the secondary and tertiary air levels with half of the ports at each level on a first wall of the boiler, and half on the opposing wall, with all of the ports on the first wall in an inboard/outboard configuration with the ports on the opposing wall, in which the lower boiler is rectangular in plan form with the sidewalls walls shorter than the front and rear walls and the secondary and tertiary ports located on the sidewalls.

*7. The combustion air system of claim 1, wherein the multiple circulation patterns comprises counter rotating circulation patterns.*

*8. The combustion air system of claim 1, wherein:*

*the boiler comprises a primary port level and a liquor gun port level located above the primary port level; and*

*the plurality of combustion air ports imparting the circulation patterns comprise a tertiary port level located above the liquor gun port level or a secondary port level located above the primary port level and below the liquor gun port level.*

*9. The combustion air system of claim 8, wherein the plurality of combustion air ports imparting the circulation patterns comprise the secondary and the tertiary levels.*

*10. The combustion air system of claim 1, wherein the injection rates of the combustion air ports are balanced to inject substantially equal kinetic energy from each port.*

*11. The combustion air system of claim 1 wherein there are an equal number of air ports on each opposing wall.*

*12. A combustion air system for a recovery boiler comprising:*

*at least one primary air level, at least one secondary air level located above the primary air level, at least one liquor gun port level located above the secondary air level, and at least one tertiary air level located above the liquor gun port level;*

*wherein the primary air level comprises one or more combustion air ports;*

*wherein the secondary air level incorporates multiple combustion air ports with one or more combustion air ports on each of two opposing walls of the boiler,*

*wherein the tertiary air level incorporates multiple combustion air ports with multiple combustion air ports on each of two opposing walls of the boiler, and*

*wherein there are an equal number of air ports of the tertiary air level on each opposing wall interlaced to impart multiple upward spiraling combustion gas circulation patterns.*

*13. A combustion air system for a recovery boiler comprising:*

*at least one primary air level, at least one secondary air level located above the primary air level, and at least one liquor gun port level located above the secondary air level;*

*wherein the primary air level comprises one or more combustion air ports;*

*wherein the secondary air level incorporates multiple combustion air ports with multiple combustion air ports on each of two opposing walls of the boiler,*

*wherein there are an equal number of air ports of the secondary air level on each opposing wall interlaced to impart multiple upward spiraling combustion gas circulation patterns.*

*14. The combustion air system of claim 13:*

*further comprising a tertiary air level located above the liquor gun level comprising multiple combustion air ports with one or more combustion air ports on each of two opposing walls of the boiler;*

*wherein the air ports of the tertiary air level are positioned to reinforce the multiple upward spiraling combustion gas circulation patterns imparted by the air ports of the secondary air level.*

*15. The combustion air system of claim 14, wherein there are an equal number of air ports of the tertiary air level on each opposing wall interlaced to reinforce the multiple upward spiraling combustion gas circulation patterns imparted by the air ports of the secondary air level.*

*16. The combustion air system of claim 14, wherein the injection rates of the ports of the secondary and the tertiary levels are balanced to inject substantially equal kinetic energy from each level.*

*17. A combustion air system for a recovery boiler comprising:*

*at least one primary air level, at least one secondary air level located above the primary air level, at least one liquor gun port level located above the secondary air level, and at least one tertiary air level located above the liquor gun port level;*

*wherein the primary air level comprises one or more combustion air ports;*

*wherein the secondary air level incorporates multiple combustion air ports with one or more combustion air ports on each of two opposing walls of the boiler,*

*wherein the tertiary air level incorporates multiple combustion air ports with one or more combustion air ports on each of two opposing walls of the boiler,*

*wherein air flow to a plurality of the combustion air ports is configured to impart multiple upward spiraling combustion gas circulation patterns, each defined about a different substantially vertical axis within the boiler; and*

*wherein the combustion air ports of the secondary air level are biased downward.*

*18. The combustion air system of claim 17, wherein the gas circulation patterns within the boiler comprise multiple circulation patterns, each defined about a different substantially vertical axis within the boiler, without a larger circulation pattern superimposed around the multiple circulation patterns.*

*19. The combustion air system of claim 17, wherein the combustion air ports of the secondary air level or the tertiary air level are positioned in an interlaced configuration.*

*20. The combustion air system of claim 17, wherein the combustion air ports of the secondary air level or the tertiary air level are positioned in an inboard/outboard configuration.*

*21. The combustion air system of claim 17, wherein a circulation rotational direction imparted by the secondary air level is reverse to a circulation rotational direction imparted by the tertiary air level.*

*22. The combustion air system of claim 17, wherein the injection rates of the ports of the secondary or tertiary air levels are balanced to inject substantially equal kinetic energy from each port.*

*23. The combustion air system of claim 17, wherein the gas circulation patterns within the boiler comprise multiple circulation patterns with a larger circulation pattern superimposed around the multiple circulation patterns.*

*24. The combustion air system of claim 17, wherein the combustion air ports of the tertiary air level are directed in a substantially horizontal direction.*

*25. A combustion air system for a recovery boiler comprising:*

*at least one primary air level, at least one secondary air level located above the primary air level, at least one liquor gun port level located above the secondary air level, and at least one tertiary air level located above the liquor gun port level;*

*wherein the primary air level comprises one or more combustion air ports;*

*wherein the secondary air level incorporates multiple combustion air ports with one or more combustion air ports on each of two opposing walls of the boiler,*

*wherein the tertiary air level incorporates multiple combustion air ports with one or more combustion air ports on each of two opposing walls of the boiler,*

*wherein air flow to a plurality of the combustion air ports is configured to impart multiple upward spiraling combustion gas circulation patterns; and*

*wherein a circulation rotational direction imparted by the secondary air level is reverse to a circulation rotational direction imparted by the tertiary air level.*

* * * * *